Aug. 13, 1940.   C. R. FORDYCE   2,211,323
VINYL ACETAL RESIN PHOTOGRAPHIC COATINGS
Filed July 27, 1938
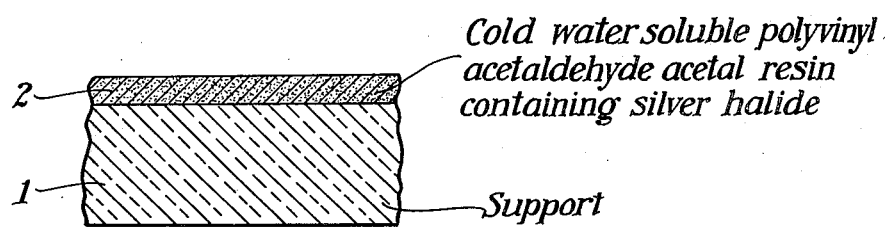
Charles R. Fordyce
INVENTOR Patented Aug. 13, 1940

2,211,323

UNITED STATES PATENT OFFICE 2,211,323

VINYL ACETAL RESIN PHOTOGRAPHIC COATING

Charles R. Fordyce, Rochester, N. Y., assignor to Eastman Kodak Company, Rochester, N. Y., a corporation of New Jersey Application July 27, 1938, Serial No. 221,584

6 Claims. (Cl. 95—7)

This invention relates to photographic coatings and particularly to coatings of a synthetic resin which is soluble in cold water.

Protective coatings on photographic films or plates such as ester or resin coatings are usually made from organic solvent solution. It would be desirable if coatings could be applied from water solution but which after coating would withstand the processing baths to which a photographic film or plate must be subjected. The solution to this problem would be a coating which could be applied from water at temperatures other than those to which the film is ordinarily subjected in processing so that it would not be removed by treatment at such temperatures. For example, if a coating could be made from cold water solution which would be insoluble in water, at ordinary temperatures, the desired conditions would be satisfied.

The polyvinyl acetaldehyde acetal resins described in Voss U. S. Patent No. 1,939,422 and Morrison et al. U. S. Patent No. 2,036,092 may be made with various proportions of hydroxyl, acetate and acetal groups in the molecule. Two methods of preparation are commonly employed in making these compounds, one of which involves the reaction of an aldehyde with polyvinyl alcohol and the other which consists in simultaneous hydrolysis of acetyl groups from polyvinyl acetate and reaction of the free hydroxyl groups so produced with aldehydes.

I have found that certain compounds of this class although insoluble in water at ordinary room temperature, are soluble in cold water, for example, at temperatures below 15° C., or preferably at 5° C. or below, and may be coated on a rigid support such as photographic film or paper from cold water solution. When these coatings are dried by evaporation of the water, they are not soluble in water at higher temperatures. These coatings may be used in various ways, for example, as protective coatings for photographic films, plates or paper or as the carrier for photographic emulsions.

The accompanying drawing shows a sectional view of a photographic emulsion made from a cold water soluble acetal resin according to my invention.

The resins which I propose to use for the purpose of my invention are polyvinyl acetaldehyde acetal resins, or mixed acetal resins in which acetaldehyde predominates as the aldehyde component, having a polyvinyl acetal content of at least 50% and an uncombined hydroxyl content corresponding to at least 15% polyvinyl alcohol.

These compounds have a structural formula which may be represented as follows:

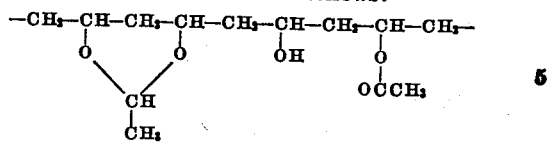

The acetal portion of the compound, instead of being entirely of acetaldehyde, may be of mixed composition, such as formaldehyde-acetaldehyde, butyraldehyde-acetaldehyde, etc., the acetaldehyde in all cases being present in greater proportion than other aldehydes.

This formula is merely illustrative of the resins which I may use and does not necessarily represent the sequence or molecular ratio in which the various groups attached to the chain occur in the resin. The composition of the resins may be varied in the process of manufacture to control the proportion of the various groups attached to the resin chain. The resins which I propose to use will always contain acetal and hydroxyl groups but they need not necessarily contain acetate groups. Resin compositions which I might use are, for example, as follows:

Acetal 50%—alcohol 15%—acetate 35%
Acetal 60%—alcohol 20%—acetate 20%
Acetal 60%—alcohol 30%—acetate 10%
Acetal 70%—alcohol 25%—acetate 5%
Acetal 80%—alcohol 20%—acetate 0%

Various agents may be added to the cold water solutions of the resins in order to control the properties of the resulting coatings. For example, water soluble plasticizers may be added to the solution if a flexible coating is desired.

Plasticizers employed must be water soluble since they are applied in water solution. They should also be compatible in large quantities with the resulting resin film so that good transparency will be obtained upon evaporation. An especially effective plasticizer is diacetin, which produces flexible, entirely clear films when used in quantities of 20% or above, based on the weight of resin. Other plasticizers, useful in concentrations of 50–100% are diethylene glycol, urea, and glycerol. Use of these plasticizers in the recommended quantities not only produces flexible films but they result in entirely transparent films by evaporation of aqueous solutions at temperatures not above 50° C., while without plasticizers stronger curing is often necessary to eliminate blushing.

Instead of using plasticizers of very high boiling point, I may employ high boiling solvents which evaporate much more slowly than water, and thus remain as residual solvent to produce transparent films but slowly evaporate upon more prolonged curing. Especially useful in this capacity is acetonyl acetone, which is effective in quantities as small as 25% of the weight of the resin. Ethyl lactate, diacetone alcohol, and ethylene glycol monomethyl ether are satisfactory if used in quantities at least equal to the weight of the resin.

One of the uses for the resin coatings made according to my invention is in the production of light-sensitive emulsions. A light-sensitive silver halide may be precipitated in a chilled water solution of the resins and by choosing resin compositions of proper water susceptibility at room temperature for penetration of the photographic processing baths, a satisfactory sensitive coating can be made. A cold water solution containing the light sensitive silver salts can be coated on a suitable support such as paper, glass or cellulosic film with a technique similar to that commonly used in the case of gelatin emulsions and after drying the resulting emulsion may be penetrated by the processing baths but is soluble in water only under strongly cooled conditions.

In using the water soluble acetal resins as photographic emulsion carriers, appropriate temperature control is, of course, an important factor. The resin must be kept completely in solution until precipitation of the silver halide is completed. A silver halide emulsion may be made in the following manner, it being understood that this example is illustrative only and that emulsions and coatings may be made in other ways.

*Example*

5 grams of a polyvinyl acetaldehyde acetal resin of 83.5% polyvinyl acetal content and 15% uncombined hydroxyl content calculated as polyvinyl alcohol was dissolved in 95 grams of water at 2–3° C. and there was added 5 grams of ethyl lactate to prevent blushing upon curing. To this solution there was added 1.7 grams of silver nitrate dissolved in a small quantity of cold water.

A solution of 1.1 grams of sodium bromide in 5 grams of water was prepared and cooled in a brine bath to 0–3° C. It was then added slowly, with stirring, to the resin solution at the same temperature. No immediate precipitate formed upon adding the bromide solution, but there slowly developed a white precipitate which was very uniform and finely divided.

The resulting solution was poured upon a glass plate. Gelation occurred almost immediately, giving a completely opaque film, which was placed in an oven at 45–50° C. overnight.

The resulting film was placed in a photographic fixing solution, which penetrated the film very rapidly, dissolving out the silver bromide, and leaving a film which, upon drying at 50° C., was transparent.

If a flexible film is desired after processing in the fixing solution, it is advisable to pass the film through an aqueous solution of diethylene glycol or diacetin or other suitable plasticizer before drying.

In the accompanying drawing, which is an enlarged sectional view of an emulsion coating made according to my invention, 1 represents a support of glass or other suitable material and 2 represents an emulsion coating of a cold-water-soluble acetaldehyde acetal resin containing a sensitive silver halide dispersed therein.

It is to be understood that the examples and uses described in the foregoing specification are illustrative only and that my invention can be used in numerous other ways to produce photographic coatings of cold-water-soluble acetal resins. It is also to be understood that where I refer in the claims to polyvinyl acetaldehyde acetal resins I intend to cover both the simple acetaldehyde acetal resins and the mixed aldehyde acetal resins in which acetaldehyde constitutes a major proportion of the aldehyde content. My invention is to be considered as limited only by the scope of the appended claims.

What I claim is:

1. The method of coating a layer of a polyvinyl acetaldehyde acetal resin on a rigid support, which comprises dissolving in water at a temperature below 15° C. a polyvinyl acetaldehyde acetal resin, having a polyvinyl acetal content of at least 50%, and an uncombined hydroxyl content corresponding to at least 15% polyvinyl alcohol, coating said solution on said support and evaporating the water from said solution.

2. The method of coating a polyvinyl acetaldehyde acetal resin on a cellulosic support which comprises dissolving in water at a temperature below 15° C. a polyvinyl acetaldehyde acetal resin having a polyvinyl acetal content of at least 50% and an uncombined hydroxyl content corresponding to at least 15% polyvinyl alcohol, coating said solution on a cellulose ester support and evaporating the water from said solution.

3. The method of forming a flexible coating of a polyvinyl acetaldehyde acetal resin on a photographic support which comprises dissolving in water at a temperature below 15° C. a polyvinyl acetaldehyde acetal resin having a polyvinyl acetal content of at least 50% and an uncombined hydroxyl content corresponding to at least 15% polyvinyl alcohol, and a water soluble organic plasticizer, coating said solution on said support and evaporating the water from said solution.

4. A light-sensitive photographic emulsion comprising a silver halide dispersed in a polyvinyl acetaldehyde acetal resin having a polyvinyl acetal content of at least 50% and an uncombined hydroxyl content corresponding to at least 15% polyvinyl alcohol and soluble in water at a temperature of below 15° C.

5. A light-sensitive photographic emulsion comprising a silver halide dispersed in a polyvinyl acetaldehyde acetal resin having a polyvinyl acetal content of at least 50% and an uncombined hydroxyl content corresponding to at least 15% polyvinyl alcohol and soluble in water at a temperature of below 15° C., said emulsion containing an organic plasticizer.

6. The process of producing a light-sensitive photographic emulsion, soluble in cold water, which comprises dispersing a silver halide in an aqueous solution of a polyvinyl acetaldehyde acetal resin at a temperature below 5° C., said resin having a polyvinyl acetal content of at least 50% and an uncombined hydroxyl content corresponding to at least 15% polyvinyl alcohol.

CHARLES R. FORDYCE.